Nov. 10, 1970   P. J. PATCHEN   3,538,788
SIX THROW BALANCED CRANKSHAFT
Filed March 13, 1969                    2 Sheets-Sheet 1
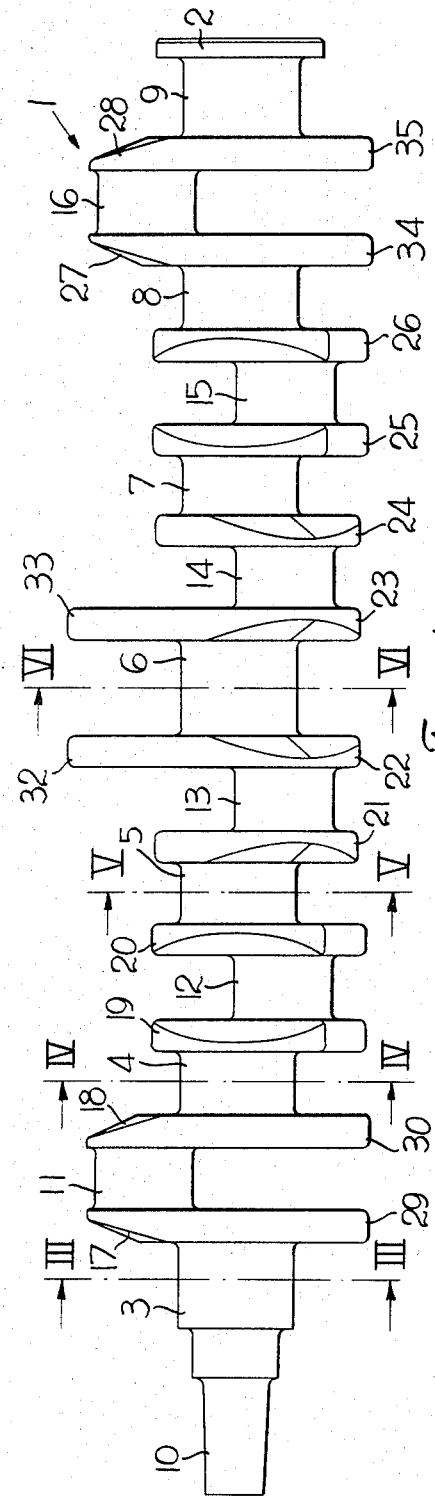
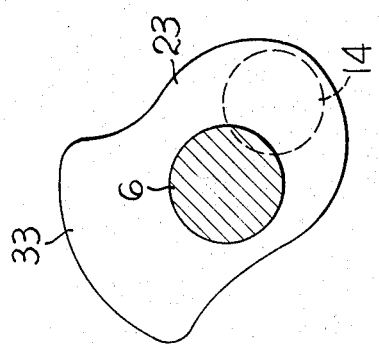
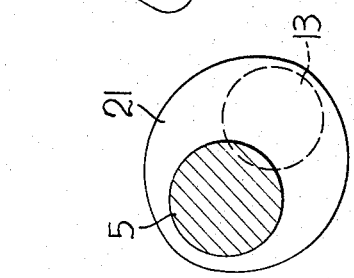
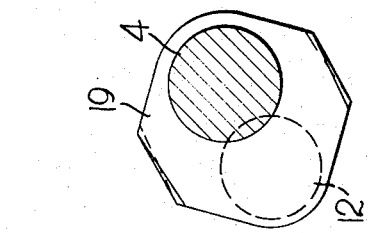
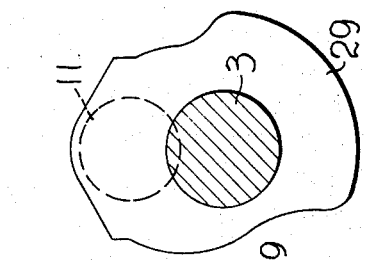
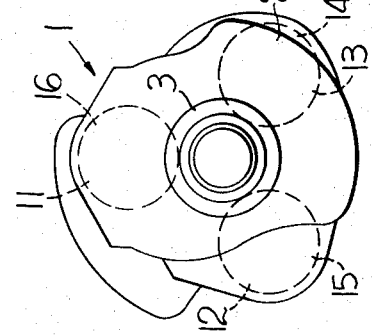
Inventor
Paul J. Patchen
By
Attorneys

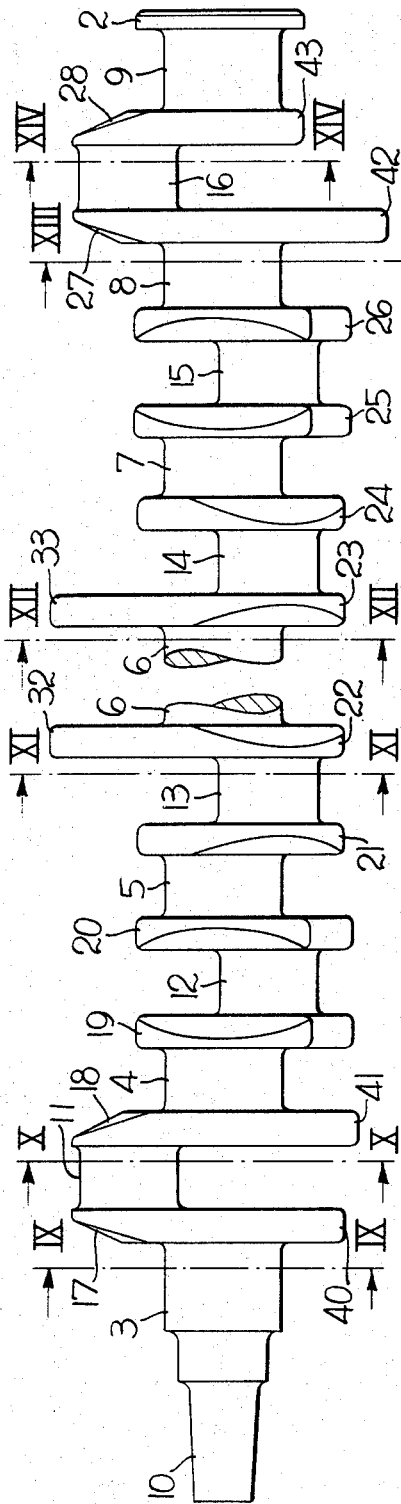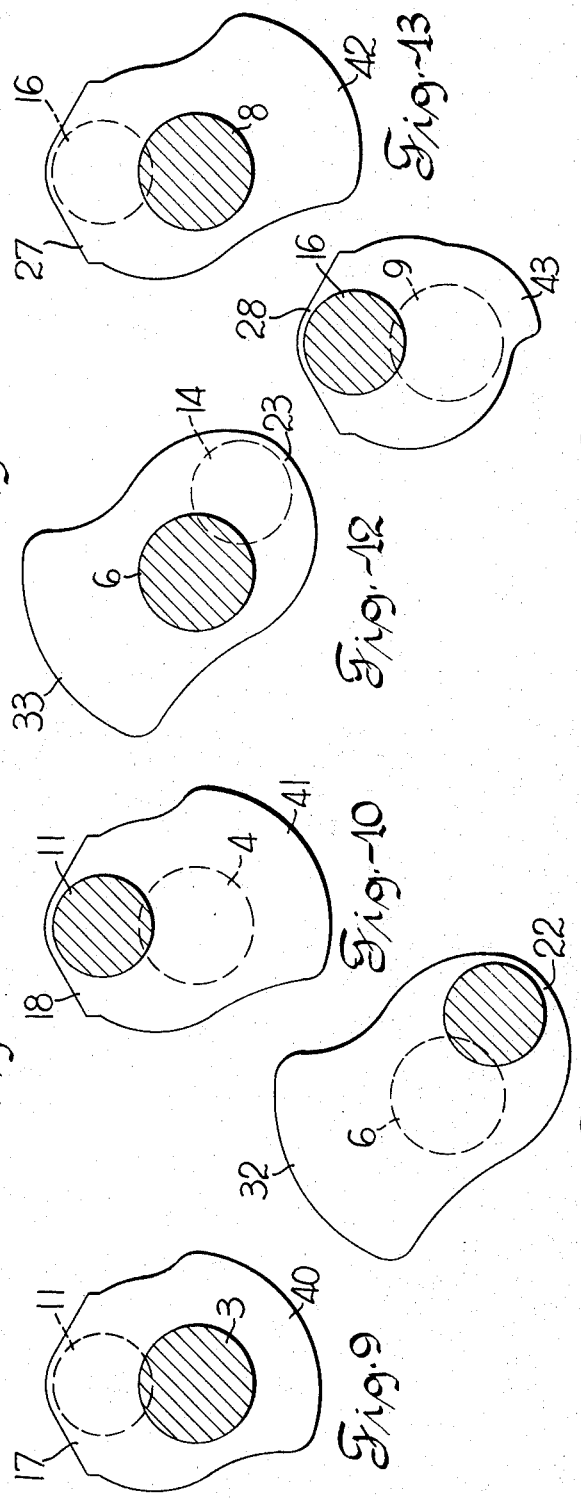

__United States Patent Office__

3,538,788
Patented Nov. 10, 1970

3,538,788
SIX THROW BALANCED CRANKSHAFT
Paul J. Patchen, Chicago, Ill., assignor to Allis-Chalmers Manufacturing Company, Milwaukee, Wis.
Filed Mar. 13, 1969, Ser. No. 807,053
Int. Cl. F16f 15/00
U.S. Cl. 74—603                                  10 Claims

ABSTRACT OF THE DISCLOSURE

A six throw balanced crankshaft using a six weight counterbalancing system.

---

This invention relates to a crankshaft and more particularly to a six counterweight balanced crankshaft.

In general, there are two systems of counterweighting used for in-line six throw crankshafts used in four cycle engines. The most common is the twelve weight system, or its variations, which attempt to counterbalance all rotating and one-half of the reciprocating mass with the intent of reducing bearing loads, primarily the center, to the lowest level. The second system puts bearing load reduction as a secondary consideration and pursues the elimination or reduction of bending stresses as the primary consideration. This disclosure involves the latter system and additionally seeks to minimize the reduction of torsional frequency for a given degree of counterbalancing.

A crankshaft employing the first system of counterbalancing probably assists in underloading the center main bearing to the greatest extent, but the counterweights are located in planes which do not coincide with the plane of bending. If the crankshaft is assumed to be infinitely rigid, the normal six throw crankshaft is assumed completely balanced for primary forces and couples, since it has mirror symmetry. In actuality, the crankshaft is not infinitely rigid, and each half possesses a primary couple, or bending movement, tending to bow the crankshaft. These couples produce bending stresses within the crankshaft and require assistance from the crankcase in limiting deflection. The magnitude of the rotating forces thus transmitted to the crankcase is sufficient to excite vibratory response experienced as engine roughness.

A crankshaft employing the second system of counterbalancing is primarily concerned with opposing the primary couples, with the intent of reducing bending stresses and crankcase vibration. The plane containing these primary couples is approximately 30° from crankpins 1 and 6 toward pins 2 and 5, and hence represents the plane in which all the counterbalancing is placed. The two usual versions of this balancing system employs either four or eight identical counterweights. In the four weight system one weight is located on each of the two center cheeks in phase with one another and one weight is placed on each end cheek 180° out of phase with those at the center. In the eight weight system one weight is located on each of the four center cheeks in phase with one another, and one weight is placed on each of the two end cheeks 180° out of phase with those of the center. In this manner resisting couples are formed to diminish or eleminate those inherent in the crank configuration.

This invention includes a six weight counterbalancing system which is based on the four and eight weight systems discussed, with the added consideration of the effect of counterweighting on altering the natural frequency of torsional vibration. In essence, the $WR^2$ of the counterweights placed at the ends of the crankshaft have the greatest influence in lowering torsional vibration frequencies and this effect should be minimized. The six weight system covered herein utilizes one full radius weight on each of the two cent cheeks as is found in the four weight system, and one reduced radius weight on each of the two end cheeks similar to the eight weight system. Since reduction in frequency in a function of $WR^2$ added to the end cheeks, using two reduced radius counterweights of equivalent moment to the one full radius weight normally used in the four weight system results in a smaller $WR^2$ hence a lesser reduction in frequency for equivalent effect of counterbalancing.

It is an object of this invention to combine a four weight and eight weight counterbalancing system to derive a six weight system having a higher natural torsional frequency than available from either of the other two systems.

It is another object of this invention to provide a six weight counterbalancing system having identical full radius counterweights on the two center six and seven cheeks, and reduced radius counterweights on the 1, 2, 11, and 12 end cheeks.

It is a further object of this invention to provide a counterbalanced six throw crankshaft having identical reduced radius weights on the 1, 2, 11 and 12 cheeks and the full radius counterweights on the 6 and 7 cheeks.

It is a further object of this invention to provide a six weight counterbalancing system on a six throw crankshaft having identical full radius counterweights on the number 6 and 7 cheeks and reduced radius counterweights on the number 1 and 2, and 11 and 12 end cheeks with the counterweight radius of the center of mass in the number 1 and 12 counterweights being equal but different from the weight and radius of the center mass of the counterweights defined by the number 2 and 11 cheeks.

It is a further object of this invention to provide a counterbalanced six throw crankshaft having identical counterweights and inertia moments on the two center 6 and 7 cheeks and counterweights on the 2 and 11 cheeks having lesser moments than the two center counterweights and counterweights and inertia moments of lesser degree on the 1 and 12 cheeks than the 2 and 11 cheeks.

The objects of this invention are accomplished in a six throw seven main bearing crankshaft. The 1 and 2 as well as 11 and 12 cheeks include counterweights having lesser moments than the center counterweight on the 6 and 7 cheeks. The four reduced radius counterweights have the same moment as two full radius counterweights used in the center positions. Reduction in the natural frequency is a function of $WR^2$ added. The two small counterweights of reduced radius have an equivalent moment to the single large full radius counterweight but have a smaller $WR^2$ hence, have lesser effect in reducing the natural frequency. Accordingly the six counterweight system is an improvement over the four and eight weight balancing system.

The preferred embodiments of this invention will be described in subsequent paragraphs and will be illustrated in the attached drawing.

FIG. 1 illustrates a side elevation view of the crankshaft;

FIG. 2 is an end view from the left end of the crankshaft shown in FIG. 1;

FIG. 3 is a cross section view taken on line III—III of FIG. 1;

FIG. 4 is a cross section view taken on line IV—IV of FIG. 1;

FIG. 5 is a cross section view taken on line V—V of FIG. 1;

FIG. 6 is a cross section view taken on line VI—VI of FIG. 1;

FIG. 7 illustrates the left hand portion of a six throw crankshaft with a full radius center counterweight and counterweights of lesser moment on the end cheeks;

FIG. 8 illustrates the right-hand portion of a crankshaft with a full radius center counterweight and a substantially equal counterweight of the number 11 cheek and a substantially smaller counterweight of the number 12 cheek;

FIG. 9 is a cross section view taken along line IX—IX of FIG. 7;

FIG. 10 is a cross section view taken along line X—X of FIG. 7;

FIG. 11 is a cross section view taken along line XI—XI of FIG. 7;

FIG. 12 is a cross section view taken along line XII—XII of FIG. 8;

FIG. 13 is a cross section view taken along line XIII—XIII of FIG. 8; and

FIG. 14 is a cross section view taken on line XIV—XIV of FIG. 8.

Referring to the drawings the crankshaft illustrated in FIG. 1 is a six throw seven main bearing crankshaft. The drive flange 2 is formed integral with the shaft. Seven bearings 3, 4, 5, 6, 7, 8, and 9 are positioned between the consecutive cranks. The tapered end 10 of the crankshaft may be suitably provided with means for driving auxiliary equipment.

The number 1, 2, 3, 4, 5 and 6 crankpins are indicated by 11, 12, 13, 14, 15, and 16, respectively. The crank arms 17 and 18 join the crankpin 11 to the main bearings 3 and 4. The crank arms 19 and 20 join the crankpin 12 to the main bearings 4 and 5. The crank arms 21 and 22 join the crankpin 13 to the main bearings 5 and 6.

Similarly the crank arms 23 and 24 join crankpin 14 to the main bearings 6 and 7. The crank arms 25 and 26 join the crankpin 15 to the main bearings 7 and 8. The crank arms 27 and 28 join the crankpin 16 to the main bearings 8 and 9.

Viewing the crankshaft 1 in the end view as shown in FIG. 2 the number 1 and 6 crankpins are indicated by 11 and 16. The number 2 and 5 crankpins are indicated by 12 and 15. The number 3 and 4 crankpins are indicated by 13 and 14. The number 1, 2 and 3 crankpins are angularly spaced 120° relative to each other as well as the number 4, 5 and 6 crankpins. The number 1 and 2 cheeks are indicated by the numbers 29 and 30 in FIG. 1 and the cheek 29 is also shown in FIG. 2.

FIG. 3 illustrates the number 1 crankpin 11 and the main bearing 3 in cross section.

FIG. 4 illustrates a cross section view showing the main bearing 4 in cross section and the crank arm 19 connected to the crankpin 12. There is no counterweight on the crank arms connected to crankpin 12.

FIG. 5 also illustrates the crank arm 21 which is similar to crank arm 20 wherein no counterweight is attached thereto. The main bearing 5 is in cross section and the crankpin 13 is shown connected to the crank arm.

FIG. 6 is a cross section view showing the main bearing 6 in cross section and the crank arm 23 connected to the crankpin 14. The number 7 cheek 33 forms a counterweight as shown and is connected to the crank arm 23.

Counterweights formed by the number 11 and 12 cheeks 34 and 35 are also reduced radius counterweights similar to the reduced radius counterweights 29 and 30. The moment of the counterweight and the angle at which it is placed must be determined for each type of design of crankshaft and may be proportioned to counterbalance the primary couples generated by the rotating shaft itself and the connecting rod ends which rotate with the crankshaft. Write the moment of the counterweight and its angular position does vary with conditions as previously stated, the angle between the line connecting the center of mass of the counterweight to the crankshaft center and the crank arm centerline is never substantially greater than 35° and never substantially less than 15°. A 30° angle is used on the illustrated crankshaft.

The counterweights in the cheeks 29 and 30 as well as the cheeks 34 and 35 are half moment counterweights, in other words the moment is equal to one-half the moment of the center counterweights in the number 6 and 7 cheeks 32 and 33.

FIGS. 7 and 8 illustrate modifications of the crankshaft shown in FIG. 1. For the purpose of illustration only half of the crankshaft is shown in FIG. 7 and also in FIG. 8. It is understood that the opposite ends of the portions of crankshafts shown are mirror images of each other and the basic difference in these crankshafts is in the radius of rotation of the center of mass defining the counterweights on the number 1 and 2 cheeks as well as the 11 and 12 cheeks. The radius of rotation of the center of mass as well as the magnitude of the weight is altered to provide a modification from the shaft shown in FIG. 1.

Referring to FIG. 7, cheek 40 is slightly smaller than cheek 29 as shown in FIG. 1, and accordingly the counterweight formed by cheek 40 is of a smaller magnitude and rotates at a slightly smaller radius. The moment of inertia of cheek 40 is less than that of cheek 29.

The cheek 41 of FIG. 7 is also slightly larger than cheek 30 shown in FIG. 1, and accordingly its mass is slightly greater and it rotates at a slightly larger radius than cheek 30. The equivalent moment of cheeks 40 and 41, however, are equal to the moments of the counterweights defined by cheeks 29 and 30.

FIG. 9 illustrates the end view of cheek 40 defining the counterweight and also FIG. 10 illustrates the counterweight defined by cheek 41 shown in FIG. 7, having slightly greater moment than the counterweight shown in FIG. 9.

Referring to FIG. 11 the counterweight 32 is of equal magnitude and moment as the center counterweight 32 is shown in FIG. 1. The difference in the crankshaft shown in FIG. 7 is in that the counterweights defined by the cheeks 40, 41 have different moments relative to each other although their combined moments are equal to the moments of the counterweights defined by cheeks 29 and 30. It is understood tat the crankshaft shown in FIG. 7 has mirror symmetry as does a crankshaft shown in FIG. 1.

Referring to FIG. 8, another modification of the crankshaft is illustrated. Again it is understood that the cheek 33 defining the center counterweight on the number 7 crank arm defines a counterweight which is equal in magnitude and moment to the counterweight 33 as illustrated in FIG. 1. The right-hand end of the crankshaft, however, is modified, as well as the left-hand end which is not illustrated. It is understood, however, that the crankshaft shown in FIG. 8 is of mirror symmetry as is the ohter crankshaft previously described.

Referring to FIG. 12 the counterweights 33 are shown with the main bearing 6 in cross section.

FIG. 13 is a cross section view taken on line XIII—XIII of FIG. 8 showing the counterweight on cheek 42 with the main bearing 8 shown in cross section. The mass of the counterweight defined by cheek 42 is greater than the mass of the counterweight defined by cheek 34 shown in FIG. 1. It is also understood that the moment of the counterweight defined by cheek 42 is also greater than half the moment of the counterweight defined by cheek 33.

FIG. 14 is a cross section view illustrating the number 12 cheek with the magnitude of the counterweight substantially reduced. The radius of the mass defined by cheek 43 is also reduced. The total moment of the two counterweights defined by the cheeks 42 and 43 is equal to the moment of the counterweight defined by cheek 33. It is understood that the mass of the counterweights and the radii may be increased and decreased as desired as long as the total moment is equal to center counterweight.

FIGS. 7 and 8 illustrate a varying magnitude and radius of rotation of the end counterweights which can be varied so that the end counterweights are reduced to almost zero while the second from the end counterweights are substantially equal to the center counterweights. This type of an arrangement increases the natural torsional frequency of the crankshaft and is considered to be the preferred embodiment. It is however understood that this invention is not limited to this particular design. The reverse condition may be used wherein the second from the end counterweights are reduced and the end counterweights are increased. To illustrate this, FIGS. 9 and 10 as well as 13 and 14 would be interchanged in FIGS. 7 and 8. The total moment of the second from the end and the end counterweights will be equal to the moment of the center counterweights on the crankshaft.

The six counterweight system as illustrated uses center counterweights which for the purpose of illustration are considered full radius counterweights in that the radius defines a base from which a relative position and also a relative magnitude of the counterweight may be defined. The two end counterweights may be equal or they may be varied by increasing and decreasing the magnitude, or the radius rotation of the counterweight. Either the end counterweight or the second from the end counterweight may be increased or decreased or its radius of rotation may be increased or decreased. The fundamental principle involved is that the moment of the two end counterweights should equal the moment of the center counterweight. As indicated previously, it has some advantage increasing the moment of the second from the end counterweight with relation to the end counterweight since this will increase the natural torsional frequency of the crankshaft which is a preferred characteristic.

The operation of the crankshaft is similar to the four weight system. The counterweights at the front and the rear are most instrumental in determining the natural torsional frequency. The reduction in the natural torsional frequency is however, undesirably reduced in the conventional four weight system. This reduction is overcome by the six weight counter system in which the counterweight equivalent moment is achieved by using two reduced radius counterweights on the ends of the crankshaft since the smaller $WR^2$ has a lesser effect in reducing the natural torsional frequency of the crankshaft. The results of the compromise of the four and eight weight counterbalancing system improves the operation characteristics of the crankshaft without incurring any disadvantages.

The embodiments of the invention in which an exclusive property or privilege is claimed are defined as follows:

1. A six throw crankshaft having a six counterweight system comprising: a crankshaft including six crankpins each connected to the main portion of the shaft by pairs of crank arms, a pair of full radius counterweights integral with the six and seven crank arms counterbalancing the center portion of the carnkshaft, a pair of reduced radius counterweights having a combined moment rotating with a reduced $WR^2$ relative to said full radius counterweights positioned integral with each of the two end crank arms, and thereby provide a balanced crankshaft producing a high torsional frequency.

2. A six throw crankshaft as set forth in claim 1 wherein said counterweights rotating at a reduced radius each have one-half the moment of the full radius counterweights.

3. A six throw crankshaft as set forth in claim 1 wherein said crankshaft includes seven main bearings.

4. A six throw crankshaft as set forth in claim 1 wherein the counterweights are defined by cheeks on the crankshaft integral with the crank arms and the center of mass of said cheeks is offset from a projected centerline of the crankarms at an angle of approximately 30°.

5. A six throw crankshaft as set forth in claim 1 wherein the centers of mass of said counterweights lie in a single plane between the planes defined by the crankpins and crankshaft center and said counterweights are positioned 180° relative to each other.

6. A six throw crankshaft as set forth in claim 1 wherein the reduced radius counterweights are positioned 180° out of phase with the full radius counterweights.

7. A six throw crankshaft as set forth in claim 1 wherein the moment of the counterweights on the center of the crankshaft are equal to the combined moments of the counterweights on the ends of the crankshaft and the moment of each of the two end counterweights are unequal with relation to each other.

8. A six throw crankshaft as set forth in claim 1 wherein the moment of the center counterweights are of the greatest magnitude and the moments of the two extreme end counterweights are of the least magnitude and the moment of counterweights intermediate the center of the end counterweights are of intermediate magnitude.

9. A six throw crankshaft as set forth in claim 1 wherein the moment of the center two counterweights are of the greatest magnitude and the moment of the second from the end counterweights are of the least magnitude and the moments of the extreme end counterweights are of intermediate magnitude.

10. A six throw crankshaft as set forth in claim 1 wherein the counterweights on the 6 and 7 cheeks are of equal magnitude and equal to the pairs of counterweights on the end of the crankshaft, and the counterweights on the number 2 and 11 cheeks are substantially equal to the center counterweights while the counterweights on the number 1 and 12 cheeks are substantially smaller than the other counterweight.

References Cited

UNITED STATES PATENTS

| | | | |
|---|---|---|---|
| Re. 16,024 | 3/1925 | Oldson | 74—603 |
| 1,328,350 | 1/1920 | Weinhardt | 74—603 |

FRED C. MATTERN, Jr., Primary Examiner

R. HEALD, Assistant Examiner

PO-1050
(5/69)

UNITED STATES PATENT OFFICE
CERTIFICATE OF CORRECTION

Patent No. 3,538,788      Dated November 10, 1970

Inventor(s) Paul J. Patchen

It is certified that error appears in the above-identified patent and that said Letters Patent are hereby corrected as shown below:

Column 6, line 1, "carnshaft" should be --- crankshaft ---
line 35, "and" should read --- end ---.

SEALED
1971

Febuary 9, 1971

(SEAL)
Attest:

Edward M. Fletcher, Jr.
Attesting Officer

WILLIAM E. SCHUYLER, JR.
Commissioner of Patents